Jan. 24, 1928.   1,657,324

J. M. SPITZGLASS

DEMAND METER FOR GAS

Filed Oct. 27, 1924   2 Sheets-Sheet 2

INVENTOR
JACOB M. SPITZGLASS

By Nissen & Crane
ATTYS.

Patented Jan. 24, 1928.

1,657,324

UNITED STATES PATENT OFFICE.

JACOB M. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS.

DEMAND METER FOR GAS.

Application filed October 27, 1924. Serial No. 745,958.

This invention relates to a device for indicating and recording the maximum demand upon a conduit through which fluid flows for any period of time.

The object of the invention is to provide a simple and convenient means for determining the maximum demand of a given consumer for gas or other fluid within the period of time determined upon. The invention is exemplified by the combination and arrangements of parts shown in the accompanying drawings and described in the following specification, and it is more particularly pointed out in the appended claims.

In the drawings—

It has long been recognized that the charge to the consumer for gas or other commodity should be based as nearly as possible upon the cost of supplying that commodity to the particular consumer. This cost will not always be proportional to the quantity of the commodity consumed. The company supplying the commodity must be prepared at all times to supply the customer with the maximum amount demanded and this readiness to serve requires the maintenance at all times of the necessary equipment for supplying the maximum demand irrespective of the quantity of the commodity actually consumed. The present invention provides means for determining the maximum demand for gas or other fluid, of each customer for a given period of time. Where a record of this kind can be obtained the company will then be in position to proportion the cost incident to its being continually ready to serve in accordance with the requirement of each customer for this readiness.

Figure 1:
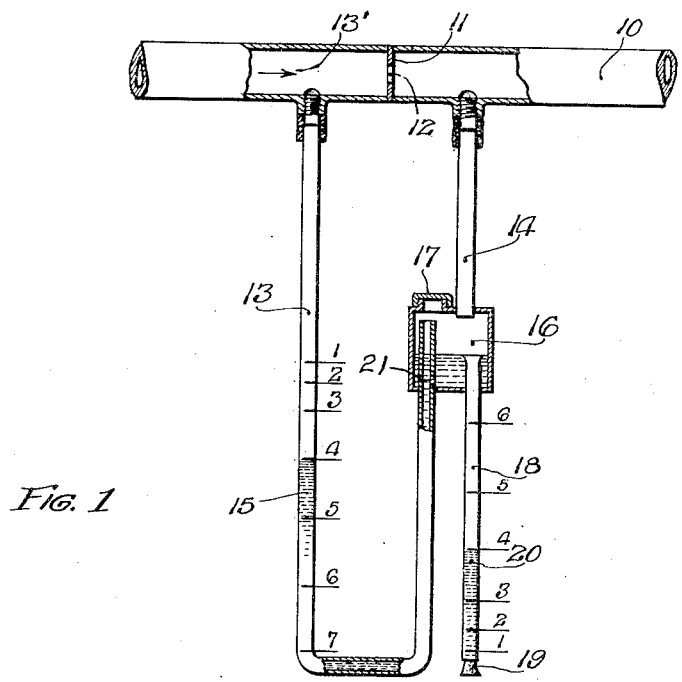
Fig. 1 is an elevation with parts in section showing one embodiment of the present invention.

In Fig. 1 of the drawings the numeral 10 designates a supply line through which gas or other fluid is delivered to a given customer. An orifice plate 11 having a restricted orifice 12 is interposed in the supply line and tubes 13 and 14 communicate with the line 10 at opposite sides of the orifice 12. The arrow 13' indicates the direction of flow of fluid in the supply line. The tubes 13 and 14 constitute a U tube, the bent portion of which contains liquid shown at 15. A liquid which does not evaporate is preferably employed. The leg 14 in the U tube is provided with a chamber 16 having a closed opening 17 through which the chamber may be filled. An appendix or overflow tube 18 enters the chamber 16 and has an open end disposed within the chamber. The lower end of the tube 18 is closed by any suitable means as by a plug 19. Suitable graduations 20 are formed on the tube 18 to indicate the height of liquid collected in the overflow tube. Liquid is placed in the U tube through the opening 17 at a time when both legs of the U tube are open to atmosphere or otherwise subjected to equal pressure. At this time the liquid will stand in both legs of the tube with its surface at the level of the open end of the tube 18. At this time also any liquid in the tube 18 is drained therefrom by removing the plug 19, after which the plug is inserted in place.

With the parts thus assembled it will be apparent that any flow of gas in the conduit 10 in the direction of the arrow 13' will produce a differential pressure which will cause a depression of the liquid in the leg 13 and a corresponding rise of the liquid in the chamber 16. As the liquid rises in the chamber 16 it will overflow and collect in the bottom of the tube 18. The differential pressure is substantially proportional to the square of the rate of flow of gas in the conduit 10, so that by properly calibrating the tube 15 the rate of flow at any time will be indicated by the depression of the liquid in that tube below the surface level in the chamber 16. If the tubes 13 and 18 are of the same bore the height of the liquid collected in the tube 18 will correspond to the amount of depression in the tube 13. If at any subsequent time a greater rate of flow occurs in the conduit 10 a greater pressure will be exerted on the U tube 13 and additional liquid will be deposited in the tube 18. At the end of any predetermined period of time the amount of liquid collected in the overflow tube 18 will indicate the maximum differential pressure during that period of time, and consequently the maximum demand made upon the conduit 10.

At each reading of the meter the liquid will be drained from the tube 18 by removing the plug 19 and a corresponding amount will be returned to the chamber 16 through the opening 17. In this way the meter will be reset for a new period of time.

Of course, it is desirable to avoid indicating a momentary flow through the line. For that purpose the low pressure side of the tube is extended upwardly in the chamber 16 above the open end of the tube 18 to retain the differential column from flowing into the appendix tube 18 momentarily. Small openings 21 are provided in the inlet tube to drain the liquid slowly into the large chamber and from there the liquid overflows slowly into the appendix tube. The openings should be close to the bottom of the large chamber 16 so they will remain under the level of the liquid at all times. The length of the upwardly projecting portion of the tube is immaterial, as in cases where a momentary differential will drive some of the liquid out of the tube it will distribute itself over the large chamber and will slowly overflow into the overflow tube. The openings are made of proper size to drain the overflow in the time period desired.

Figure 2:
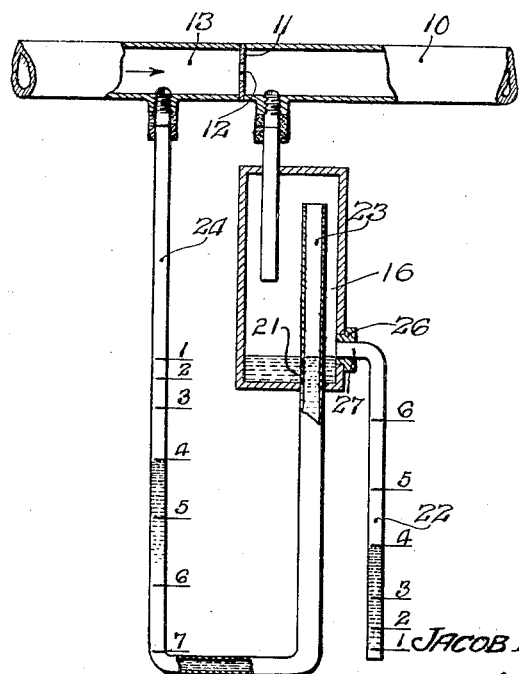
Figs. 2, 3 and 4 are views similar to Fig. 1 showing different modifications of the invention.

In the form of the invention shown in Fig. 2 the overflow tube 22 is connected to the side of the chamber 16. The low pressure tube 23 may, if desired, have a greater diameter than the high pressure tube 24 since the amount of overflow does not depend upon the size of the low pressure tube. The amount of liquid displaced each time is equal to the volume depressed in tube 24. The openings 21 in tube 23 cause the level in that tube to be the same before and after each displacement. The zero position of the liquid will be at the level of the lowest portion of the opening in the wall of the chamber 16 to which the appendix tube is connected, and sufficient liquid is provided to fill both legs of the tube to this level. A fluid-tight bushing 26 is provided for the upper end of the overflow tube 22 and the lower end of the overflow tube is sealed. The upper end of the tube 22 is bent as shown at 27 and this portion has a rotary fluid-tight fit in the bushing 26. In this form of instrument to reset the device it is only necessary to turn the tube 22 in its bushing 26 until the liquid flows back into the U tube. The overflow tube is then returned to its downward position and the instrument is again ready for operation. This insures the return of the proper quantity of liquid to the U tube at each setting without the necessity of any measurements, and without the necessity of opening the meter to atmospheric pressure.

Figure 3:
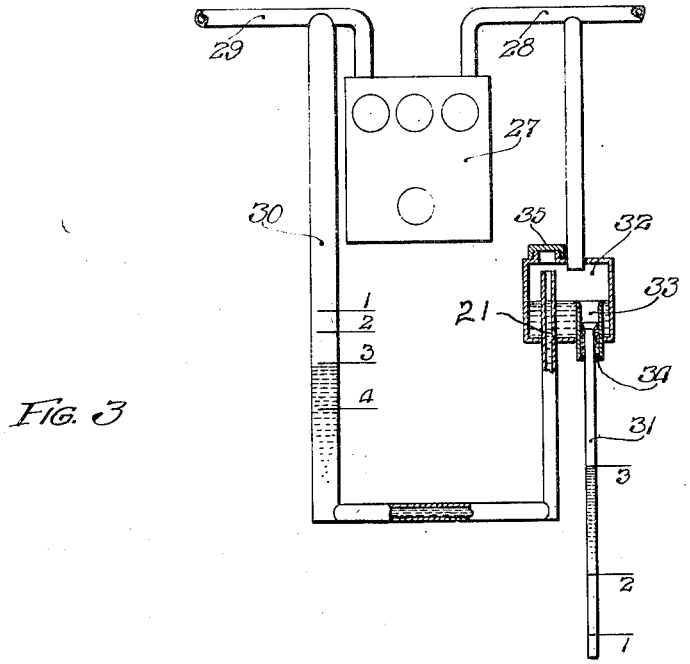

Instead of a restricted orifice to provide the differential pressure the two legs of the U tube may be attached to opposite sides of the usual commercial gas meter and the differential pressure is caused by the flow of the gas through the meter. This arrangement is shown in Fig. 3, in which the numeral 27 designates any usual form of gas meter connected with the two portions 28 and 29 of the supply pipe, the gas entering the meter through the portion 29 and leaving through the portion 28.

There are various kinds of meters on the market. Some measure primarily volume, others measure primarily rate of flow. In either kind there is always a certain amount of pressure necessary to overcome the resistance of the meter to the flow of the fluid. In those that are classified under the rate of flow meters, the differential pressure is used as a criterion for the measurments. In the volumetric meters the differential pressure is caused by the inherent resistance of the meter to the flow of the fluid through it.

One can readily see that every fluid meter will develop a differential pressure in the conduit across the connections to and from the meter. This differential pressure is necessary to overcome the resistance to the flow through the obstruction of the meter. Consequently, the magnitude of the differential pressure bears a certain relation to the rate of flow of the fluid measured by the meter.

The main object of my invention is to utilize the inherent differential pressure of a fluid meter for actuating a demand meter connected across the resistance of the fluid meter. The demand meter connected across the inlet and outlet of the fluid meter, utilizes for its operation, the existing differential pressure without any additional resistance to the flow of the fluid through the conduit.

The application of this principle can be demonstrated thus: Connect a U tube to the inlet and outlet of the meter, respectively. Attach an appendix or overflow tube to the outlet side of the U tube. Fill the U tube with the proper liquid to the height of the inlet to the appendix tube. When the meter is in operation a certain amount of liquid will be displaced by the differential pressure and that amount will drop into the appendix and will show the quantity displaced by the differential pressure and the corresponding amount of flow that was attained in the line. The flow may come to zero many times during the given period, and the only time that additional liquid will drop into the appendix will be when the differential will exceed the previous differential in the line.

In Fig. 3 of the drawing the high pressure leg 30 of the U tube is shown as having a larger bore than that of the overflow tube 31. With this arrangement a small depression of liquid in the tube 30 will produce a much longer column in the tube 31 so that small differential pressure may be accurately read. This form of instrument is essentially a low differential pressure instrument.

The same effect may be secured by placing the tube 30 in an inclined position. The figure also shows a slightly different arrangement of the overflow tube in which a chamber 32 similar to chamber 16 is interposed in the low pressure leg and a discharge pipe 31 projects upwardly above the bottom of the chamber 32. The pipe 33 is provided with a packed opening 34 for receiving the upper end of the overflow tube 31. This arrangement will permit of the withdrawal of the tube 31 from its connection with the overflow tube 32 without danger of spilling liquid from the housing 32. The liquid in the overflow tube 31 may be returned to the system through the opening 35 in the top of the chamber 32. This will insure the return of the proper amount of liquid when the instrument is reset.

Figure 4:
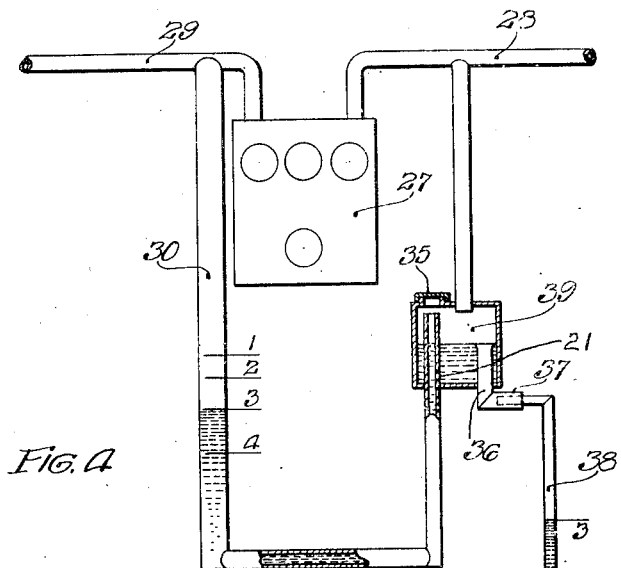

The form shown in Fig. 4 is similar to that shown in Fig. 3, except that the overflow tube discharge pipe 36 is provided with a horizontal bend 37 in which the overflow tube 38 has a rotary fluid-tight fit. This instrument may be reset by rotating the tube 38 until the liquid therein returns to the system. Where this form of connection for the overflow is used the filling opening for the chamber 39 may be omitted.

In any one of the forms shown the liquid may be a mineral oil of high flash point when the instrument is used for gas or a liquid heavier than the one measured when the instrument is used for indicating the demand in the flow of water or any other liquid. For instance, in the case of a water flow, if the U tube is filled with mercury to the level of the overflow an amount of mercury equivalent to the maximum demand will be collected in the overflow tube and will indicate that demand by its height.

I claim:

1. The combination with a conduit for fluid, of a vessel so shaped as to contain balanced liquid columns and so connected with the conduit that said columns respectively are subjected to different pressures produced by flow of fluid in said conduit, and an overflow tube pivotally connected with one of said columns so as to be capable of being swung about a horizontal axis to permit return of liquid therefrom to said vessel while said tube remains connected with said vessel.

2. The combination with a conduit for fluid, of a quantity meter interposed in said conduit, a U-tube connected with said conduit at opposite sides of said quantity meter and having liquid therein subjected to different pressures due to the flow of fluid in said conduit through said quantity meter, and an overflow tube connected with the low pressure leg of said U-tube, there being a restricted orifice in the connection between the low pressure leg of said U-tube and said overflow tube.

3. The combination with a conduit for fluid having means for causing differential pressure when fluid flows in said conduit, of a U-tube having the legs thereof subjected to different pressures incident to said flow, a chamber interposed in the low pressure leg of said U-tube, said leg having an open portion disposed above the bottom of said chamber and having a restricted opening near the bottom of said chamber, and an overflow tube connected with said chamber above said restricted opening.

4. The combination with a gas line having a quantity meter therein, of a demand meter comprising a U-tube connected with said gas line at opposite sides of said quantity meter to subject the surfaces of liquid in said U-tube to the different pressures in said gas line at opposite sides of said quantity meter incident to the flow of gas in said gas line through said quantity meter, and an overflow tube connected with the low pressure leg of said U-tube for collecting and retaining liquid which rises in said leg due to said different pressures thus providing at any time an indication of the maximum flow during the period of operation of said demand meter prior to the time of observation.

In testimony whereof I have signed my name to this specification on this 23rd day of October, A. D. 1924.

JACOB M. SPITZGLASS.